(12) United States Patent
Tan et al.

(10) Patent No.: US 6,529,240 B2
(45) Date of Patent: Mar. 4, 2003

(54) RANDOM ACCESS MEMORY INTEGRATED WITH CMOS SENSORS

(75) Inventors: Charles M. C. Tan, Santa Clara, CA (US); Wayne M. Greene, Los Gatos, CA (US); Francis Joseph, Sunnyvale, CA (US)

(73) Assignee: Agilent Technologies, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/442,650

(22) Filed: Nov. 18, 1999

(65) Prior Publication Data

US 2002/0067417 A1 Jun. 6, 2002

(51) Int. Cl.[7] .................................................. H04N 3/14
(52) U.S. Cl. ....................................................... 348/302
(58) Field of Search ................................ 348/302, 308, 348/301, 377; 257/678

(56) References Cited

U.S. PATENT DOCUMENTS 5,748,303 A * 5/1998 Korta et al. ................. 356/229
5,920,274 A * 7/1999 Gowda et al. ............... 341/155
6,034,884 A * 3/2000 Jung ........................... 365/145

OTHER PUBLICATIONS

Yang et al., Mar. 1999, IEEE Journal of Solid–State Circuits, vol. 34.*

* cited by examiner

*Primary Examiner*—Wendy R. Garber
*Assistant Examiner*—Rashawn N. Tillery

(57) ABSTRACT

An imaging device includes a Gray Code generator and an array of pixels. Each pixel includes a complimentary metal oxide semiconductor ("CMOS") sensor, a comparator and random access memory (e.g., ferroelectric random access memory). The Gray Code generator is started at the beginning of capture mode and begins providing a sequence of code words. Within each pixel, an output of a CMOS sensor is compared to a threshold, and a code word in the sequence is stored in random access memory when the sensor output crosses the threshold. Thus, the random access memory of each pixel stores a code word that represents the intensity of light detected by its associated CMOS sensor.

23 Claims, 4 Drawing Sheets

RANDOM ACCESS MEMORY INTEGRATED WITH CMOS SENSORS

BACKGROUND OF THE INVENTION

The invention relates to image sensors and random access memory. More specifically, the invention relates to a CMOS image sensor that is integrated with random access memory.

Charge coupled devices ("CCDs") and complimentary metal oxide semiconductor ("CMOS") imaging sensors are presently being used in consumer electronic products such as digital cameras, PC video cameras, laptop computers, cellular phones and toys. They are also being used in high-quality digital imaging applications such as surveillance and security cameras, and in biometric measurement applications such as fingerprint-recognition systems.

CMOS imaging devices offer a number of advantages over CCDs. CMOS imaging devices consume much less power than similar CCDs. This advantage is particularly important for consumer electronic products.

CMOS components are fabricated in mainstream silicon foundries. Because CMOS is an established technology that is used for many different types of integrated circuits, it has the advantage of manufacturing economies of scale that drive down defect density and production costs. Higher yields and less susceptibility to defects make CMOS a lower cost technology for image sensors than CCD. Fewer parts, a smaller form factor, and higher reliability in the end products mean cost savings to systems manufacturers.

CMOS imaging devices tend to produce better images than CCDs. CCDs rely on a process that can leak charge to adjacent pixels when the CCD register overflows; thus bright lights "bloom" and cause unwanted streaks in captured images. CMOS imaging devices are inherently less sensitive to this effect. In addition, smear—caused by charge transfer in the CCD under illumination—is non-existent with CMOS imaging devices.

CMOS imaging devices allow for higher system integration. With CMOS, signal processing can be integrated directly with the imaging device on a single chip. On-chip analog-to-digital ("A/D") conversion facilitates driving high-speed signals off-chip. Once converted to digital, sensor signals are less sensitive to pickup and crosstalk. Timing control can be integrated onto the sensor chip. On-chip digital signal processing functions can also be performed, from color encoding, image stabilization and compression to motion tracking, video conferencing and wireless control. In addition, standard camera functions such as Automatic Gain Control, color balance, and automatic exposure and focus control can be performed on the sensor chip.

It would be desirable to integrate random access memory ("RAM") onto the sensor chip. However, there are certain problems to overcome. One problem is voltage sag. A typical CMOS active pixel sensor includes multiple stages of charge amplifiers. Each stage reduces strength of the sensor signal.

Another problem is converting the CMOS sensor signals to digital prior to storage in the RAM. The amount of silicon area taken up by A/D converters can be quite substantial. Integrating conventional A/D converters with each pixel would greatly increase the size and cost of the sensor chip, especially if high resolution is desired. Reducing the number of AND converters by, for example, using only one A/D converter per row of pixels would reduce chip size and cost; however, it could create fixed pattern noise in the image. Human eyes are very sensitive to detecting fixed pattern noise.

SUMMARY OF THE INVENTION

These problems are overcome by the present invention. According to one aspect of the present invention, a CMOS imaging device includes a code generator and a plurality of pixels. Each pixel includes a CMOS sensor, a comparator and random access memory. At the beginning of a capture mode, the code generator is started. Within each pixel, the comparator compares an output of the CMOS sensor to a threshold. When the output crosses the threshold, a code word from the code generator is stored in the random access memory. Thus, raw pixel data is represented by digital code words. The code words can be converted afterwards to raw pixel data.

Other aspects and advantages of the present invention will become apparent from the following detailed description, taken in conjunction with the accompanying drawings, illustrating by way of example the principles of the invention.

DETAILED DESCRIPTION OF THE INVENTION

Figure 1:
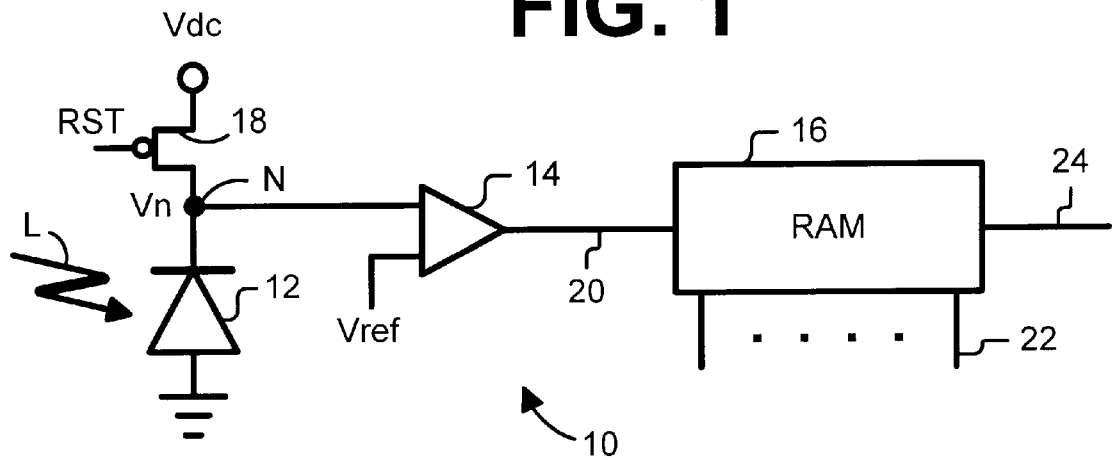
FIG. 1 is an illustration of a pixel of a CMOS imaging device, the pixel including a CMOS sensor, a comparator and random access memory.

As shown in the drawings for purposes of illustration, the invention is embodied in a CMOS imaging device. The CMOS imaging device includes a single Gray Code generator and an array of pixels. Each pixel includes a CMOS sensor, a comparator and random access memory. At the beginning of image capture, the Gray Code generator is started and begins issuing a sequence of code words. Within each pixel in the meantime, a sensor output is compared to a reference voltage. When the sensor output crosses the reference voltage, the last code word issued (that is, the current code word) is stored in the random access memory. Different code words represent different light intensity levels. After the image has been captured, the code words are read out and converted to raw pixel data. Thus, each pixel stores a digital value without the use of a conventional A/D converter. The comparators and the Gray Code generator occupy significantly less area than a plurality of conventional A/D converters. Thus, cost and size of the imaging device are reduced. Additionally, the use of charge amplifiers is eliminated, and only a single analog node exists between the sensor and random access memory of each pixel. Consequently, signal losses caused by noise and voltage drops across multiple analog amplifiers are reduced. Moreover, the reference voltage may be varied during image capture, which allows dynamic range of the imaging device to be increased.

Reference is made to FIG. 1, which shows a pixel 10 of a CMOS imaging device. The pixel 10 includes a CMOS sensor 12, a CMOS comparator 14, and pixel memory 16, which may include random access memory 16. The CMOS sensor 12, which may be manufactured on standard CMOS processes, has a resistance that is inversely proportional to the intensity of incident light L. Thus, resistance of the sensor 12 is reduced as intensity of the incident light L is increased.

The pixel 10 also includes a reset switch 18, which is coupled between the sensor 12 and a dc voltage source. When the reset switch 18 is closed, the dc voltage source applies a reset voltage Vdc to a node N. The node N has an inherent capacitance. The node N accumulates a charge while the reset switch 18 is closed. Voltage Vn at the node N can be reset to Vn=Vdc or Vn<Vdc.

When the reset switch 18 is opened, the sensor 12 begins detecting light and pulling down the node voltage Vn. The rate at which the node voltage Vn is pulled down will depend upon the intensity of the incident light L on the sensor 12.

Figure 2:
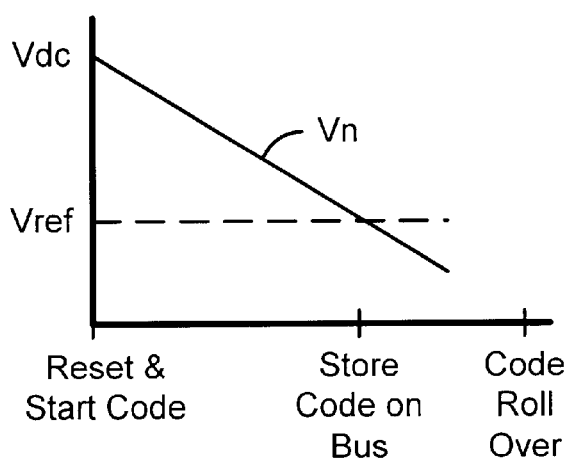
FIG. 2 is a plot of a sensor signal and a fixed reference voltage.

FIG. 2 shows an example in which the reset switch 18 is closed until the node voltage Vn=Vdc. Then the reset switch 18 is opened, whereby the sensor 12 begins detecting light and pulling down the node voltage Vn.

The comparator 14 compares the node voltage Vn to a reference voltage Vref. The comparator 14 may be a cross-latched inverter. When the node voltage Vn crosses the reference voltage Vref, the comparator 14 "selects" a write word line 20 by generating a pulse on the write word line 20. The pulse on the write word line 20 causes a digital word on a data bus 116 (shown in FIG. 3) to be strobed into the pixel memory 16.

The pixel memory 16 includes a plurality of memory cells. The actual number of memory cells is a matter of design choice. One bit line 22 may be provided for each memory cell, and a single read word line 24 may be provided for all of the memory cells. A code word may be written to the pixel memory 16 by setting the voltages on the bit lines 22 and selecting the write word line 20 (which occurs when the node voltage Vn crosses the reference voltage Vref). The pixel memory 16 may be read out by selecting the read word line 24 and sensing the bit lines 22 to determine the logic states of the memory cells.

Figure 3:
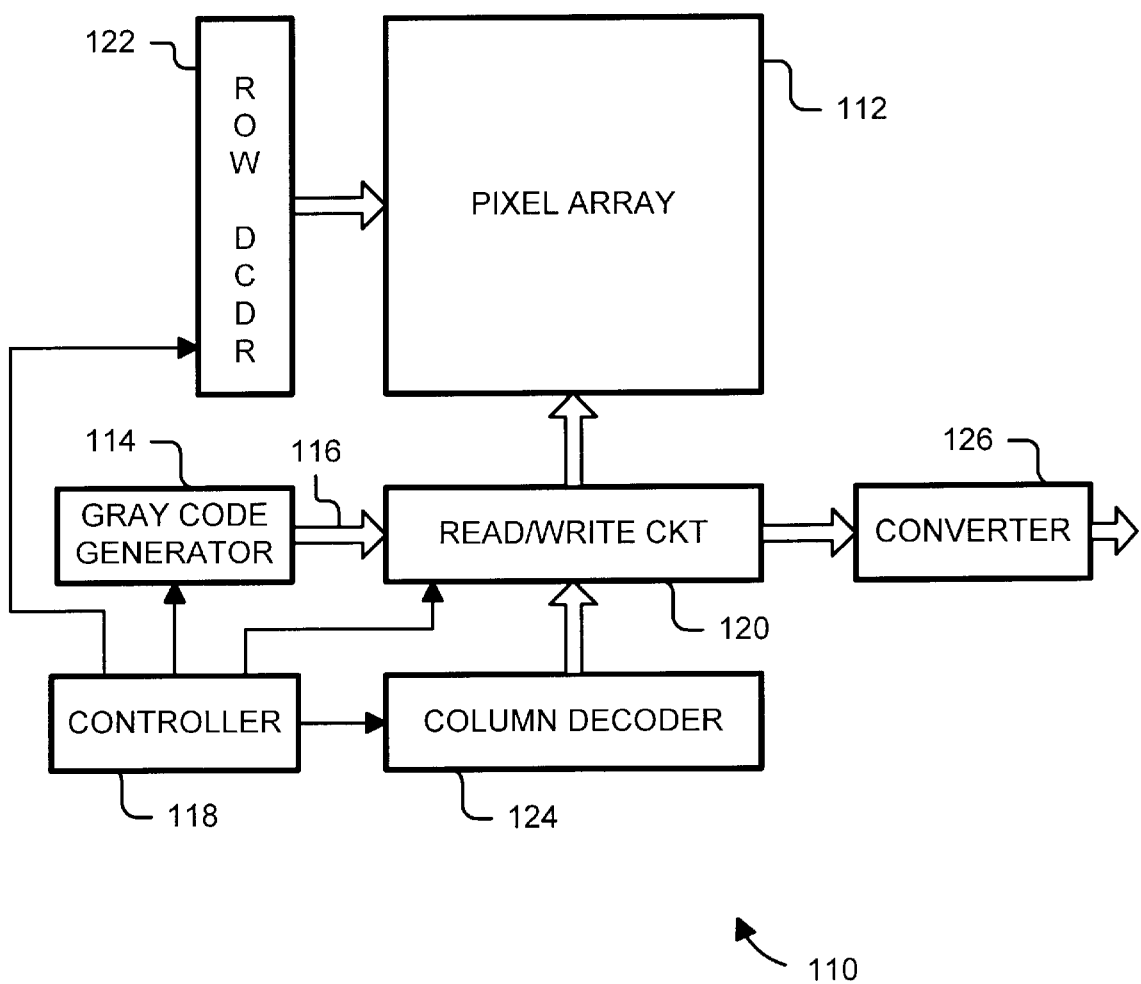
FIG. 3 is an illustration of the CMOS imaging device.

FIG. 3 shows the CMOS imaging device 110. The device 110 includes an array 112 of the pixels 10. One write word line 20 is provided for each pixel 10. One read word line 24 is provided for each row of pixels 10. The memory cells in a row are all connected to the same read word line 24. Multiple bit lines 22 are provided for each column of pixels 10. For example, sixteen bit lines 22 per pixel column may be provided for 16-bit random access memory 16. The memory cells in a memory cell column (as opposed to a pixel column) are connected to the same bit line 22.

The CMOS imaging device 110 further includes a Gray Code generator 114, which generates a sequence of code words. Consecutive code words in the sequence differ by only a single transition. The Gray Code generator 114 may be implemented as a finite state machine.

When the Gray Code generator 114 is started, it places code words on the data bus 116 at a high frequency, such as 800 MHz. Although the code words on the data bus 116 are updated at regular intervals, the node voltage Vn of each pixel 10 may cross the reference voltage Vref at any time. The crossing is not synchronized to a clock pulse. Consequently, the node voltage Vn can cross the reference voltage Vref while the Gray Code generator 114 is placing a new code word on the data bus 116.

If a 16-bit binary counter is used instead of the Gray Code generator, the node voltage Vn might cross the reference voltage Vref while the counter is sequencing from 0111111111111111b to 1000000000000000b. In that case, all sixteen bits would be in transition when the node voltage Vn crosses the reference voltage Vn. Therefore, all sixteen bits on the data bus 116 would be unknown.

Use of the Gray Code avoids that situation. Since consecutive code words in the Gray Code sequence differ by only a single transition, no more than one bit would be unknown. Thus, use of the Gray Code reduces the number of unknown bits to a single bit at most, regardless of the length of the code word.

The imaging device 110 further includes a controller 118. The controller 118, which also may be implemented as a finite state machine, operates the imaging device 110 in image capture and readout modes of operation. An image frame is captured by storing code words in pixel memory 16 during the image capture mode and then reading out the pixel memory 16 during the readout mode.

Figure 4A:
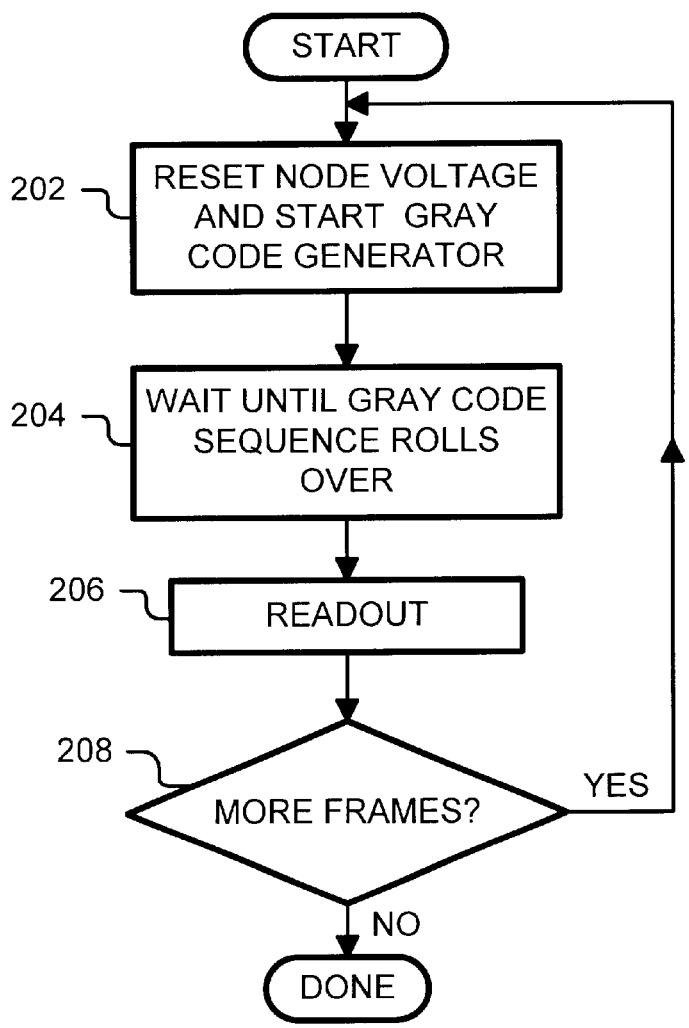
FIG. 4a is a flowchart of a method of controlling the imaging device.
Figure 4B:
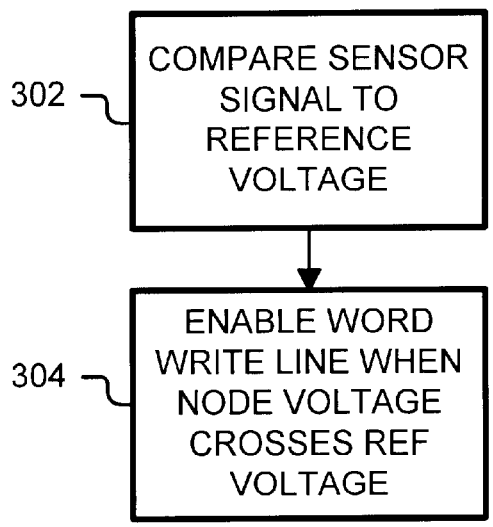
FIG. 4b is a flowchart of a detection method for each pixel of the imaging device.

Additional reference is now made to FIGS. 4a and 4b, which show how a frame is captured and read out. At the beginning of the image capture mode, the controller 118 generates a global signal RST that closes all of the reset switches 18 at the same time (block 202). Closing the reset switches 18 at the same time causes the node voltages Vn of all of the pixels 10 to be set to a desired level. The initial level of the node voltage Vn will depend upon how long the switches 18 are opened.

When the reset switches 18 are opened, the controller 118 commands the Gray Code generator 114 to begin providing a sequence of code words on the data bus 116 (block 202). The controller 118 then waits for the Gray Code sequence to roll over (block 204). While the controller 118 is waiting, it commands a read/write circuit 120 to write the current code word on the data bus 116 to pixel memory 16. A code word is not actually written to the individual pixel memory 16 of a pixel 10, however, until the write word line 20 of that pixel 10 is selected.

During this waiting period, each pixel is comparing its node voltage Vn to the reference voltage Vref (block 302) and selecting its write word line 20 when the node voltage Vn crosses the reference voltage Vref (block 304). Thus, a code word on the data bus 116 is written into the memory 16 of a pixel 10 when the node voltage Vn of that pixel 10 crosses the reference voltage Vref.

The pixels 10 are performing these steps 302 and 304 independently of each other. The sensors 12 will pull down the node voltages Vn at different rates, the rates depending upon intensity of detected light. For different pixels 10, node voltages Vn will cross the reference voltage Vref at different times. Consequently, those different pixels 10 will store different code words. The different code words represent the different light intensities.

After the Gray Code sequence has rolled over, the controller 118 transitions from the image capture mode to the readout mode. During the readout mode, the controller 118 commands the read/write circuit 120, a row decoder 122 and a column decoder 124 to read out the code words stored in the memory 16 of each pixel 10 (block 206). The row decoder 122 selects the read word lines 24, and the read/write circuit 120 senses the logic states on bit lines 22 that are selected by the column decoder 124. The read/write circuit 120, row decoder 122 and column decoder 124 may be of conventional construction.

The read/write circuit 120 supplies the code words to a Gray-to-binary converter 126, which converts the code words to binary values. The binary values, which represent raw pixel data, may be supplied to additional processing circuitry on board the CMOS imaging device 110, or the raw pixel data may be supplied to I/O pads of the device 110. In this manner, a frame is captured and read out.

If the imaging device 110 is used for capturing video, additional frames may be captured and read out (block 208). Thus, after the readout of a frame has been completed, the controller 118 transitions back to image capture mode (that is, the controller 118 resets the sensors 12 and restarts the Gray Code generator 118, and waits for the Gray Code sequence to roll over again).

The controller 118 can also increase the dynamic range of the imaging device 110 by varying the reference voltage Vref. The controller 118 may include a counter and a D/A converter for ramping the reference voltage Vref up or down. Counter frequency and direction controls the rate at which the reference voltage Vref is ramped.

Figure 5:
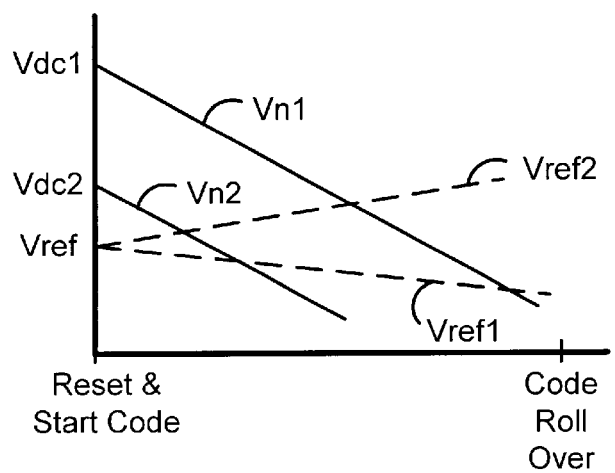
FIG. 5 is a plot of sensor signals and ramped reference voltages.

FIG. 5 illustrates how the dynamic range may be increased. Ramping down the reference voltage Vref1 allows each sensor 12 to detect light over a longer period of time. This, in turn, increases exposure time, which allows darker images to be captured with greater detail. Conversely, ramping up the reference voltage Vref2 reduces exposure time, which allows brighter objects to be captured without saturating the sensors 12. Node voltages Vn1 and Vn2 can be started at different levels Vdc1 and Vdc2 to affect dynamic range of the imaging device.

Figure 6:
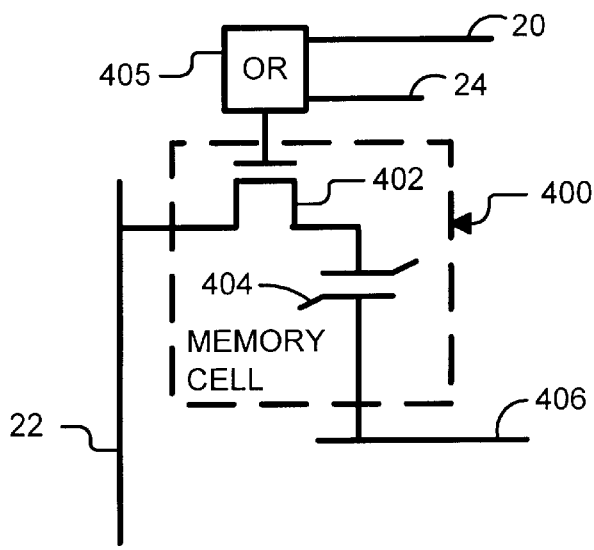
FIG. 6 is an illustration of an FeRAM cell for the pixel.

The pixel memory 16 may be ferroelectric random access memory ("FeRAM"). An FeRAM cell 400 is shown in FIG. 6. The FeRAM cell 400 includes an access transistor 402 and a ferroelectric capacitor 404. The capacitor 404 includes first and second plates that are separated by a thin film of ferroelectric material. The ferroelectric capacitor 404 has hysteresis. If polarization of the capacitor 404 is positive, a sufficient negative voltage applied to the ferroelectric capacitor 404 will cause the polarization to become negative. Similarly, if the polarization is negative, a sufficient positive voltage applied to the ferroelectric capacitor 404 will cause the polarization to become positive.

The access transistor 402 has a gate connected to a write word line 20 and a read word line 24 via an OR logic block 405. The access transistor 402 also has a drain-source path connected between a bit line 22 and the first plate of the capacitor 404. The second plate of the ferroelectric capacitor 404 is connected to a plate line 406. The access transistor 402 functions as a switch for connecting the ferroelectric capacitor 404 to the bit line 22.

The ferroelectric capacitor 404 has two stable polarization states, which correspond to binary values. Additionally, the ferroelectric capacitor 404 retains its state without electric power. Therefore, it is non-volatile.

The bit line 22 and the plate line 406 are used in combination to apply positive and negative voltages to the ferroelectric capacitor 404. For instance, a first polarization state can be written to the ferroelectric capacitor 404 by turning on the access transistor 402, pulling the plate line 406 high and pulling the bit line 22 low. A second polarization state can be written to the ferroelectric capacitor 404 by turning on the access transistor 402, pulling the bit line 22 high and pulling the plate line 406 low.

Figure 7:
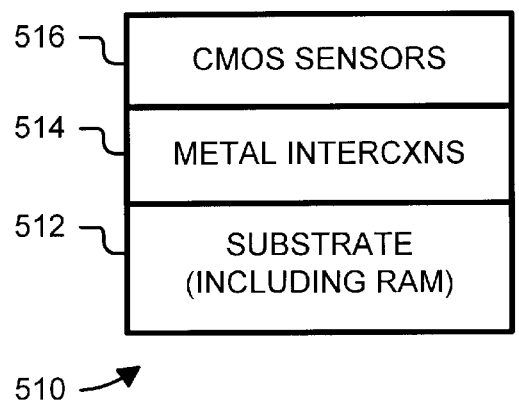
FIG. 7 is an illustration of an Application Specific Integrated Circuit including the CMOS imaging device.

FIG. 7 shows an Application Specific Integrated Circuit ("ASIC") 510 including the CMOS imaging device 110. The ASIC 510 includes a silicon substrate 512 containing analog and digital circuitry including the Gray Code generator 114, the controller 118, the read/write circuit 120, the row and column decoders 122 and 124, and the Gray Code converter 126. The substrate 512 also contains the pixel memory 16.

A first level 514, formed on the substrate 512, includes metal interconnections. The metal interconnections also act as a light shield so that light doesn't shine on the comparators and other circuitry on the substrate 512. Formed atop the metal interconnections, at a second level 516, are the CMOS sensors 12. The CMOS sensors 12 may be formed on the metal interconnections using an alpha-silicon process.

Thus disclosed is a CMOS imaging device in which CMOS sensors are integrated with random access memory without the use of conventional A/D converters. The comparators and the Gray Code generator occupy significantly less area than the conventional A/D converters. Eliminating the A/D converters reduces the cost and size of the imaging device. Additionally, charge amplifiers are eliminated, which further reduces the size and cost of the imaging device. Moreover, each pixel has only a single analog node between the sensor and random access memory. Reducing the number of analog nodes reduces signal losses caused by noise and voltage drops across multiple analog amplifiers. Finally, the dynamic range of the imaging device may be increased by varying the reference voltage during image capture.

Integrated FeRAM offers advantages over other types of integrated memory, such as integrated flash memory. In comparison to flash memory, FeRAM is less expensive and it operates at lower voltages. Additionally, FeRAM is much faster than flash memory. Whereas flash type EEPROM cells can take microseconds to write and milliseconds to erase, FeRAM devices can take nanoseconds to read and write.

The invention is not limited to the specific embodiments described and illustrated above. The pixel memory is not limited to FeRAM. For instance, DRAM such as 3T DRAM may be used. If DRAM is used, however, the read/write circuit would also have to periodically refresh the DRAM cells.

Although the pixel memory may be used to store code words representing pixel data, it is not so limited. The pixel memory may also be used, or pixel memory may be added, for storing correction values for fixed pattern noise (pixel, column wise, temperature, etc.), and programmable coefficients such as for digitization (linear, sqrt, log), correction algorithms, color pipeline coefficients, and compressed pixel values.

Accordingly, the invention is not limited to the specific embodiments described and illustrated above. Instead, the invention is construed according to the claims that follow.

What is claimed is:

1. A CMOS imaging device having a capture mode of operation, the device comprising:
    a digital code generator;
    an array of CMOS sensors;
    a plurality of comparators, each comparator being associated with a CMOS sensor and being connected during the capture mode of operation to receive from the associated CMOS sensor an associated sensor signal that varies at a rate depending on light incident on the associated CMOS sensor; and
    random access memory associated with each comparator;
    during the capture mode of operation, at least one comparator comparing its associated sensor signal to a threshold and causing a digital code from the code generator to be stored in its associated random access memory when the associated sensor signal reaches the threshold.

2. A CMOS imaging device having an image capture mode of operation, the device comprising:
   a Gray Code generator;
   an array of CMOS sensors;
   a plurality of comparators, each comparator being associated with a CMOS sensor and being connected during the capture mode of operation to receive from the associated CMOS sensor an associated sensor signal that varies at a rate depending on light incident on the associated CMOS sensor; and
   random access memory associated with each comparator;
   during the capture mode of operation, at least one comparator comparing an output of its associated sensor to a threshold and causing an output of the Gray code generator to be stored in its associated random access memory when an output of the associated sensor reaches the threshold.

3. The device of claim 1, wherein the random access memory includes ferroelectric random access memory.

4. The device of claim 1, further comprising a controller for varying the threshold.

5. The device of claim 1, further comprising means for resetting the sensor outputs at the beginning of the capture mode of operation.

6. The device of claim 5, further comprising a controller for controlling the device to capture multiple frames of the image, the controller causing the resetting means to reset the sensor outputs to different levels over different frames.

7. The device of claim 6, the controller further causing the threshold to vary during each frame.

8. The device of claim 1, the device further having a readout mode of operation and further comprising a controller, the code generator providing a code sequence during the capture mode, the controller starting the capture mode, waiting for the code sequence to roll over, and beginning the readout mode when the code sequence rolls over.

9. The device of claim 1, wherein each pixel of the imaging device includes a CMOS sensor, a comparator and random access memory.

10. The device of claim 1, wherein the code generator, comparators and random access memory are formed on a substrate; wherein metal interconnections are formed atop the substrate; and wherein the CMOS sensors are formed atop the metal interconnections.

11. A pixel of a CMOS imaging device, the pixel comprising:
    a CMOS sensor;
    a comparator for comparing an output of the CMOS sensor to a threshold; and
    random access memory for storing a code word when an output signal from the CMOS sensor reaches the threshold;
    the comparator and random access memory formed on a substrate, metal interconnections formed atop the substrate; and the CMOS sensor formed atop the metal interconnections.

12. The pixel of claim 11, wherein the random access memory includes ferroelectric random access memory.

13. The pixel of claim 11, further comprising a reset switch coupled to the CMOS sensor.

14. A method of detecting an image, the method comprising:
    using a plurality of sensors to detect the image, each sensor providing a sensor signal that varies at a rate depending on light incident on the sensor;
    for each sensor, during the capture mode of operation, beginning a sequence of digital codes when the detection begins;
    comparing the sensor to a threshold; and
    storing a digital code from the sequence when one of the sensor signals crosses the threshold.

15. The method of claim 14, further comprising ramping the threshold while the image is being detected.

16. The method of claim 14, further comprising resetting the sensor signal before the detection begins.

17. The method of claim 16, wherein the sensor is connected to a node having a voltage, and wherein the sensor pulls down the node voltage during image detection, the sensor signal-corresponding to the node voltage.

18. The method of claim 17, wherein the image is captured over multiple frames, and wherein the node voltage is reset to different levels at the beginning of different frames.

19. The method of claim 14, wherein the method ends when the code sequence rolls over.

20. The method of claim 14, further comprising:
    using an array of sensors to simultaneously provide respective sensor signals, the sensor signals varying at rates depending on light incident on the respective sensors;
    simultaneously comparing the sensor signals to the threshold; and
    for each of the sensor signals, storing a digital code from the sequence when that sensor signal crosses the threshold.

21. The device of claim 1, wherein the digital code generator generates a sequence of digital codes such that only one of the bits in each digital code differs from a corresponding bit in a preceding digital code in the sequence.

22. The device of claim 1, wherein the CMOS sensors are in one-to-one correspondence with the comparators.

23. The device of claim 2, wherein during the capture mode of operation, each comparator causes the output of the Gray code generator to be stored in its associated random access memory occurs asynchronously with the Gray Code generator changing the output, and at most one bit of the output is in transition each time the output is stored.

* * * * *